United States Patent
Underwood et al.

(10) Patent No.: US 11,308,176 B1
(45) Date of Patent: Apr. 19, 2022

(54) SYSTEMS AND METHODS FOR DIGITAL CHANNEL TRANSITIONS

(71) Applicant: Meta Platforms, Inc., Menlo Park, CA (US)

(72) Inventors: Patrick Joseph Roark Underwood, San Francisco, CA (US); Geoff David Joseph Teehan, Palo Alto, CA (US); George Lewis Kedenburg, III, San Francisco, CA (US); Jason Holland, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 67 days.

(21) Appl. No.: 16/358,962

(22) Filed: Mar. 20, 2019

(51) Int. Cl.
| | | |
|---|---|---|
| *G06F 16/9536* | (2019.01) | |
| *G06F 16/9535* | (2019.01) | |
| *G06F 16/44* | (2019.01) | |
| *G06Q 50/00* | (2012.01) | |
| *G06F 16/9538* | (2019.01) | |
| *G06F 3/0488* | (2013.01) | |
| *G06F 3/04883* | (2022.01) | |

(52) U.S. Cl.
CPC ...... *G06F 16/9536* (2019.01); *G06F 3/04883* (2013.01); *G06F 16/44* (2019.01); *G06F 16/9535* (2019.01); *G06F 16/9538* (2019.01); *G06Q 50/01* (2013.01)

(58) Field of Classification Search
CPC .. G06F 16/9536; G06F 16/44; G06F 16/9535; G06F 16/9538; G06F 3/04883; G06Q 50/01
See application file for complete search history.

(56) References Cited

U.S. PATENT DOCUMENTS

| | | | |
|---|---|---|---|
| D599,366 S | 9/2009 | Brown et al. | |
| D599,368 S | 9/2009 | Kanga et al. | |
| D608,365 S | 1/2010 | Walsh et al. | |

(Continued)

FOREIGN PATENT DOCUMENTS

WO    2015/149375 A1    10/2015

OTHER PUBLICATIONS

Preinterview First Office Action received for U.S. Appl. No. 16/358,380 dated Aug. 5, 2020, 13 pages.

(Continued)

*Primary Examiner* — Stephen S Hong
*Assistant Examiner* — Nicholas Hasty
(74) *Attorney, Agent, or Firm* — FisherBroyles, LLP

(57) ABSTRACT

Systems and methods for extracting data from digital messages for digital group compositions may include (1) providing, to a user of a social media application, a consumption interface that displays social media posts from multiple different channels, (2) displaying, within the consumption interface, a series of one or more posts from a first channel, (3) once a final post from the series has been displayed, altering an appearance of the consumption interface to signal a transition from displaying the series of posts from the first channel to displaying an additional series of one or more posts from a second channel, and (4) upon altering the appearance of the consumption interface, displaying, within the consumption interface, the additional series of posts from the second channel. Various other methods, systems, and computer-readable media are also disclosed.

20 Claims, 5 Drawing Sheets

Method
100

110 — Providing, to a user of a social media application, a consumption interface that displays social media posts from various different channels 120 — Displaying, within the consumption interface, a series of one or more posts from a first channel 130 — Once a final post from the series has been displayed, altering an appearance of the consumption interface to signal a transition from displaying the series of posts from the first channel to displaying an additional series of one or more posts from a second channel 140 — Upon altering the appearance of the consumption interface, displaying, within the consumption interface, the additional series of posts from the second channel

(56) References Cited

U.S. PATENT DOCUMENTS

| | | |
|---|---|---|
| D614,643 S | 4/2010 | Viegers et al. |
| D648,735 S | 11/2011 | Arnold et al. |
| D651,608 S | 1/2012 | Mien et al. |
| D664,561 S | 7/2012 | Gleasman et al. |
| D664,988 S | 8/2012 | Gleasman et al. |
| D692,456 S | 10/2013 | Brinda et al. |
| D692,915 S | 11/2013 | Brinda et al. |
| D699,744 S | 2/2014 | Ho Kushner et al. |
| 8,645,463 B2 | 2/2014 | Knight et al. |
| D701,227 S | 3/2014 | Lee |
| D716,339 S | 10/2014 | Lee |
| D730,383 S | 5/2015 | Brinda et al. |
| D730,386 S | 5/2015 | Ryan et al. |
| D736,247 S | 8/2015 | Chen et al. |
| D736,248 S | 8/2015 | Chen et al. |
| D746,866 S | 1/2016 | Memoria et al. |
| D753,709 S | 4/2016 | Kawanabe |
| D755,239 S | 5/2016 | Lee et al. |
| D755,814 S | 5/2016 | Rad et al. |
| D757,086 S | 5/2016 | Kang |
| D759,666 S | 6/2016 | Kuhn et al. |
| D762,671 S | 8/2016 | Chan et al. |
| D765,101 S | 8/2016 | Park et al. |
| D766,308 S | 9/2016 | Park et al. |
| D769,295 S | 10/2016 | Han et al. |
| D769,306 S | 10/2016 | Bowen et al. |
| D781,328 S | 3/2017 | Fong et al. |
| D785,028 S | 4/2017 | Federighi et al. |
| D785,643 S | 5/2017 | Boa et al. |
| D789,396 S | 6/2017 | Alonso Ruiz et al. |
| D789,969 S | 6/2017 | Chaudhri et al. |
| D789,983 S | 6/2017 | Kim |
| D794,651 S | 8/2017 | Cavander et al. |
| D798,331 S | 9/2017 | Fong et al. |
| D800,754 S | 10/2017 | De Cock et al. |
| D803,869 S | 11/2017 | Kuhn et al. |
| D806,741 S | 1/2018 | Majernik et al. |
| D807,898 S | 1/2018 | Memoria et al. |
| D808,413 S | 1/2018 | Wu et al. |
| D809,003 S | 1/2018 | Sowden et al. |
| D815,130 S | 4/2018 | Phillips et al. |
| D815,666 S | 4/2018 | Burns |
| D816,110 S | 4/2018 | Choi et al. |
| D816,701 S | 5/2018 | Ball et al. |
| D817,972 S | 5/2018 | Karunamuni et al. |
| 9,998,796 B1 | 6/2018 | Kedenburg, III et al. |
| 10,009,308 B2 * | 6/2018 | Brunn ............... G06F 16/24578 |
| D824,944 S | 8/2018 | Sagrillo et al. |
| D825,594 S | 8/2018 | Wu et al. |
| D831,059 S | 10/2018 | Bao |
| D832,876 S | 11/2018 | Chung et al. |
| D834,602 S | 11/2018 | Bao |
| D836,118 S | 12/2018 | Patel |
| D836,121 S | 12/2018 | Leong et al. |
| D842,867 S | 3/2019 | Jedrzejowicz et al. |
| D845,324 S | 4/2019 | Hemsley et al. |
| D847,855 S | 5/2019 | Majernik et al. |
| D853,431 S | 7/2019 | Sagrillo et al. |
| D854,031 S | 7/2019 | Alvarez et al. |
| D858,552 S | 9/2019 | Westerhold et al. |
| D859,446 S | 9/2019 | Westerhold et al. |
| D859,450 S | 9/2019 | Krishna |
| D860,227 S | 9/2019 | Fung et al. |
| D860,233 S | 9/2019 | Chaudhri et al. |
| D862,501 S | 10/2019 | Patel |
| D863,324 S | 10/2019 | Kang et al. |
| D868,804 S | 12/2019 | Bragdon |
| D870,141 S | 12/2019 | Bowden et al. |
| D877,762 S | 3/2020 | Feng et al. |
| D879,127 S | 3/2020 | Feng et al. |
| D879,829 S | 3/2020 | Amini et al. |
| D881,219 S | 4/2020 | Ngo et al. |
| D881,220 S | 4/2020 | Feng et al. |
| D882,593 S | 4/2020 | Fatnani et al. |
| D882,608 S | 4/2020 | Murphy et al. |
| D882,609 S | 4/2020 | Murphy et al. |
| D882,612 S | 4/2020 | Antilion et al. |
| D882,613 S | 4/2020 | Zumbrunnen et al. |
| 10,623,917 B1 | 4/2020 | Paul |
| D885,410 S | 5/2020 | Butler |
| D885,421 S | 5/2020 | Lunaparra et al. |
| D886,128 S | 6/2020 | Fatnani et al. |
| D887,428 S | 6/2020 | Fatnani et al. |
| D890,198 S | 7/2020 | Paul |
| D890,204 S | 7/2020 | Bussière et al. |
| D894,206 S | 8/2020 | Naruns et al. |
| D895,664 S | 9/2020 | Baber et al. |
| D900,833 S | 11/2020 | Alonso Ruiz et al. |
| D900,845 S | 11/2020 | Tomori |
| D904,426 S | 12/2020 | Paul |
| D904,431 S | 12/2020 | Park et al. |
| D904,432 S | 12/2020 | Park et al. |
| D905,095 S | 12/2020 | Park et al. |
| 10,852,915 B1 | 12/2020 | Behzadi et al. |
| 10,868,788 B1 | 12/2020 | Underwood et al. |
| D910,054 S | 2/2021 | Silfver et al. |
| D910,064 S | 2/2021 | Paul |
| D912,075 S | 3/2021 | Sharp et al. |
| D913,304 S | 3/2021 | VanDuyn et al. |
| D913,306 S | 3/2021 | Davem et al. |
| D913,314 S | 3/2021 | Paul |
| D914,726 S | 3/2021 | Gouliard et al. |
| D914,741 S | 3/2021 | Anzures et al. |
| D915,440 S | 4/2021 | Kim et al. |
| D916,884 S | 4/2021 | Dascola et al. |
| 2004/0021673 A1 | 2/2004 | Messi et al. |
| 2008/0034307 A1 | 2/2008 | Cisler et al. |
| 2009/0148124 A1 | 6/2009 | Athsani et al. |
| 2009/0177754 A1 | 7/2009 | Brezina et al. |
| 2009/0216859 A1 | 8/2009 | Dolling |
| 2009/0313578 A1 | 12/2009 | Roh et al. |
| 2009/0327939 A1 | 12/2009 | Johns et al. |
| 2010/0211872 A1 | 8/2010 | Rolston et al. |
| 2010/0231533 A1 | 9/2010 | Chaudhri |
| 2011/0010182 A1 | 1/2011 | Turski et al. |
| 2011/0010659 A1 | 1/2011 | Kim et al. |
| 2011/0016417 A1 | 1/2011 | Shiplacoff et al. |
| 2011/0252381 A1 | 10/2011 | Chaudhri |
| 2011/0271328 A1 | 11/2011 | Sutton-Shearer |
| 2011/0283304 A1 | 11/2011 | Roberts et al. |
| 2011/0289067 A1 | 11/2011 | Jordan et al. |
| 2012/0005224 A1 | 1/2012 | Ahrens et al. |
| 2012/0089950 A1 | 4/2012 | Tseng |
| 2012/0110052 A1 | 5/2012 | Smarr et al. |
| 2012/0110621 A1 * | 5/2012 | Gossweiler, III .... H04N 21/488 725/46 |
| 2012/0151322 A1 | 6/2012 | Lindsay et al. |
| 2012/0151342 A1 | 6/2012 | Trotta et al. |
| 2012/0151415 A1 | 6/2012 | Park et al. |
| 2012/0210386 A1 | 8/2012 | Kim et al. |
| 2012/0271883 A1 | 10/2012 | Montoya et al. |
| 2013/0073976 A1 | 3/2013 | McDonald et al. |
| 2013/0097556 A1 | 4/2013 | Louch |
| 2013/0106903 A1 | 5/2013 | Nagata et al. |
| 2013/0145291 A1 | 6/2013 | Weber et al. |
| 2013/0254709 A1 | 9/2013 | Koshimae et al. |
| 2013/0312027 A1 | 11/2013 | Baumel et al. |
| 2014/0032672 A1 | 1/2014 | Yoshikawa et al. |
| 2014/0047074 A1 | 2/2014 | Chung et al. |
| 2014/0049692 A1 * | 2/2014 | Sirpal ...................... H04N 5/45 348/569 |
| 2014/0189010 A1 | 7/2014 | Brown et al. |
| 2014/0244659 A1 * | 8/2014 | Liu ...................... G06F 16/435 707/748 |
| 2014/0258110 A1 | 9/2014 | Davis et al. |
| 2014/0282208 A1 | 9/2014 | Chaudhri |
| 2014/0317116 A1 | 10/2014 | Shah et al. |
| 2014/0317201 A1 | 10/2014 | McNeil et al. |
| 2014/0317660 A1 | 10/2014 | Cheung et al. |
| 2014/0359789 A1 | 12/2014 | Pitt |
| 2015/0022558 A1 | 1/2015 | Li |
| 2015/0049591 A1 | 2/2015 | Adams et al. |
| 2015/0113436 A1 | 4/2015 | Penha et al. |
| 2015/0154676 A1 | 6/2015 | Matousek et al. |

(56) References Cited

U.S. PATENT DOCUMENTS

| | | |
|---|---|---|
| 2015/0200985 A1 | 7/2015 | Feldman et al. |
| 2015/0370798 A1 | 12/2015 | Ju et al. |
| 2016/0057154 A1 | 2/2016 | Ferguson et al. |
| 2016/0171453 A1 | 6/2016 | Zorfas |
| 2016/0197993 A1 | 7/2016 | Perkowski et al. |
| 2016/0232600 A1 | 8/2016 | Purves |
| 2016/0330258 A1 | 11/2016 | Sandhu |
| 2016/0337291 A1 | 11/2016 | Park et al. |
| 2016/0357305 A1 | 12/2016 | Wells et al. |
| 2016/0357368 A1 | 12/2016 | Federighi et al. |
| 2016/0373455 A1 | 12/2016 | Shokhrin et al. |
| 2016/0380952 A1 | 12/2016 | Vora et al. |
| 2017/0060349 A1 | 3/2017 | Munoz et al. |
| 2017/0131864 A1 | 5/2017 | Edgar |
| 2017/0164063 A1 | 6/2017 | Lewis et al. |
| 2017/0180299 A1 | 6/2017 | Garza |
| 2017/0195736 A1* | 7/2017 | Chai ............... G06F 3/04817 |
| 2017/0242899 A1 | 8/2017 | Jolley et al. |
| 2017/0270535 A1 | 9/2017 | McKee et al. |
| 2017/0295249 A1 | 10/2017 | Vickrey et al. |
| 2017/0315677 A1 | 11/2017 | Rice et al. |
| 2017/0359290 A1 | 12/2017 | Hsu et al. |
| 2018/0063278 A1 | 3/2018 | Helled et al. |
| 2018/0113579 A1 | 4/2018 | Johnston et al. |
| 2018/0121031 A1 | 5/2018 | Ta et al. |
| 2018/0174106 A1 | 6/2018 | Kenthapadi et al. |
| 2018/0192142 A1 | 7/2018 | Paul |
| 2018/0218160 A1 | 8/2018 | Wetherall et al. |
| 2018/0309806 A1 | 10/2018 | Huynh et al. |
| 2018/0349485 A1* | 12/2018 | Carlisle ............. G06F 16/958 |
| 2018/0349502 A1 | 12/2018 | Maycock |
| 2018/0365270 A1 | 12/2018 | Azout et al. |
| 2019/0095067 A1 | 3/2019 | Huang et al. |
| 2019/0335008 A1 | 10/2019 | Majoros et al. |
| 2020/0007675 A1 | 1/2020 | Khanukaev |
| 2020/0151815 A1 | 5/2020 | Whitfield |
| 2020/0211125 A1 | 7/2020 | McCuskey |
| 2020/0218413 A1 | 7/2020 | VanDuyn |
| 2020/0267435 A1 | 8/2020 | Gordon et al. |
| 2020/0326839 A1 | 10/2020 | Walkin et al. |
| 2021/0029131 A1 | 1/2021 | Mertens et al. |
| 2021/0097630 A1 | 4/2021 | Whilby |
| 2021/0105244 A1 | 4/2021 | O'Rourke et al. |

OTHER PUBLICATIONS

Holland, Jason, "Systems and Methods for Digital Content Navigation Based on Directional Input", U.S. Appl. No. 17/008,089, filed Aug. 31, 2020, 59 pages.

Holland, Jason, "Systems And Methods For Prioritizing Digital User Content Within A Graphical User Interface", U.S. Appl. No. 17/008,083, filed Aug. 31, 2020, 56 pages.

Preinterview First Office Action received for U.S. Appl. No. 16/358,025 dated Apr. 30, 2020, 55 pages.

First Action Interview received for U.S. Appl. No. 16/358,025 dated Jul. 17, 2020, 55 pages.

Final Office Action received for U.S. Appl. No. 16/358,025 dated Sep. 2, 2020, 77 pages.

Non-Final Office Action received for U.S. Appl. No. 16/358,032 dated Apr. 3, 2020, 40 pages.

Final Office Action received for U.S. Appl. No. 16/358,032 dated Aug. 25, 2020, 45 pages.

Preinterview First Office Action received for U.S. Appl. No. 16/361,631 dated Oct. 2, 2020, 28 pages.

Preinterview First Office Action received for U.S. Appl. No. 16/358,969 dated Apr. 2, 2020, 18 pages.

Final Office Action received for U.S. Appl. No. 16/358,969 dated Jun. 15, 2020, 18 pages.

Notice of Allowance received for U.S. Appl. No. 16/358,969 dated Aug. 25, 2020, 15 pages.

Underwood, Patrick Joseph Roark, "Systems And Methods For Generating Digital Channel Content", U.S. Appl. No. 17/084,690, filed Oct. 30, 2020, 40 pages.

Underwood et al., "Snap Scroll", U.S. Appl. No. 29/684,315, filed Mar. 20, 2019, 16 pages.

Underwood et al., "Fanning Interface", U.S. Appl. No. 29/684,316, filed Mar. 20, 2019, 13 pages.

Underwood et al., "Display Device with Graphical User Interface", U.S. Appl. No. 29/685,031, filed Mar. 26, 2019, 12 pages.

Underwood et al., "Display Device with Graphical User Interface", U.S. Appl. No. 29/685,030, filed Mar. 26, 2019, 12 pages.

Underwood et al., "Display Device with Graphical User Interface", U.S. Appl. No. 29/685,029, filed Mar. 26, 2019, 14 pages.

Underwood et al., "Bottom-Focused Channel Overview", U.S. Appl. No. 29/684,604, filed Mar. 22, 2019, 15 pages.

Underwood et al., "Bottom-Focused Channel", U.S. Appl. No. 29/684,606, filed Mar. 22, 2019, 13 pages.

Underwood et al., "Display Screen with Graphical User Interface", U.S. Appl. No. 29/685,028, filed Mar. 26, 2019, 14 pages.

Underwood et al., "Vertical To Horizontal Interface Flow", U.S. Appl. No. 29/684,609, filed Mar. 22, 2019, 13 pages.

Underwood et al., "Limited Screen to Full Screen Interface Flow", U.S. Appl. No. 29/684,610, filed Mar. 22, 2019, 14 pages.

Holland, Jason, "Display Screen with a Graphical User Interface", U.S. Appl. No. 29/748,663, filed Aug. 31, 2020, 13 pages.

Holland, Jason, "Display Screen with a Graphical User Interface", U.S. Appl. No. 29/748,664, filed Aug. 31, 2020, 12 pages.

Holland, Jason, "Display Screen with a Graphical User Interface", U.S. Appl. No. 29/748,668, filed Aug. 31, 2020, 12 pages.

Holland, Jason, "Display Screen with a Graphical User Interface", U.S. Appl. No. 29/748,669, filed Aug. 31, 2020, 12 pages.

Holland, Jason, "Display Screen with a Graphical User Interface", U.S. Appl. No. 29/748,670, filed Aug. 31, 2020, 12 pages.

Non-Final Office Action received for U.S. Appl. No. 16/358,025 dated Mar. 1, 2021, 75 pages.

Non-Final Office Action received for U.S. Appl. No. 16/358,032 dated Feb. 3, 2021, 57 pages.

Final Office Action received for U.S. Appl. No. 16/358,380 dated Apr. 15, 2021, 51 pages.

Non-Final Office Action received for U.S. Appl. No. 17/008,089 dated Mar. 19, 2021, 52 pages.

Peyton, "PS3 Tutorial: Game Menu", URL : https://www.youtube.com/watch?v=j30_ViiptsA, Jul. 29, 2012, 4 pages.

Ex Parte Quayle Action received for U.S. Appl. No. 29/684,609 dated Apr. 28, 2021, 82 pages.

Final Office Action received for U.S. Appl. No. 16/361,631 dated Apr. 8, 2021, 58 pages.

Ex Parte Quayle Action received for U.S. Appl. No. 29/684,315 dated Apr. 29, 2021, 87 pages.

Bergmann, Martha, Home Screen Sliding Animation, posted at dribbble, URL: <https://dribbble.com/shots/4328249-Home-Screen-Sliding-Animation-1-15> posting date Mar. 10, 2016. Site visited Apr. 22, 2021, 1 page.

Nugroho, Adi, "Daily UI Challenge #10 Simple Date App, posted at dribbble", URL: <https://dribbble.com/shots/3710148-Daily-UI-Challenge-10-Simple-Date-App> posting date Aug. 3, 2017 Site visited Apr. 22, 2021, 1 page.

Li, Zhi et al., Chinese design No. 303978893, published at Orbit, Dec. 12, 2016, 14 pages.

Yang, Jinlong, Chinese design No. 303329806, published at Orbit, Aug. 12, 2015, 7 pages.

Piao, Rongwan et al., Chinese design No. 303479533, published at Orbit, Dec. 2, 2015, 6 pages.

Kang, You-Jin et al., Korean design No. 300944195, published at Orbit, Feb. 13, 2018, 7 pages.

Rahimi, Ehsan, "Music Playlist App Interaction, posted at dribbble", URL: <https://dribbble.com/shots/4650389-Music-Playlist-App-Interaction>, posting date May 30, 2018. Site visited Apr. 24, 2021, 1 page.

Ries, Vilem, "Wander app, posted at dribbble", URL: <https://dribbble.com/shots/5402223-Wander-app-interactions-2>, posting date Oct. 16, 2018. Site visited Apr. 24, 2021, 1 page.

Non-Final Office Action received for U.S. Appl. No. 29/684,316 dated Apr. 26, 2021, 75 pages.

Luo, Yi, "Chinese Design No. 304180173", published at Orbit, Jun. 16, 2017, 8 pages.

(56) References Cited

OTHER PUBLICATIONS

Song, Yuting, "Chinese Design No. 303841816", Sep. 7, 2016, 6 pages.
Liu, "Chinese Design No. 304005631", published at Orbit, Jan. 11, 2017, 4 pages.
Wang, Yufeng, "Chinese Design No. 303617576", Mar. 16, 2016, 7 pages.
Marcelino, Bruno, "Gestures Glamour: How to Set Up Swipeable Stacked Cards", URL: <https://www.outsystems.com/blog/posts/gestures_glamour_swipeable_stacked_cards/>, Mar. 9, 2018, 13 pages.
Perera, Nimasha, "Card Stack Animation-2, posted at dribbble", URL: <https://dribbble.com/shots/2377045-Card-Stack-Animation-2>, posting date Nov. 28, 2015. Site visited Apr. 20, 2021, 1 page.
Ex Parte Quayle Action received for U.S. Appl. No. 29/684,604 dated Apr. 27, 2021, 62 pages.
Gu, Fengtao, "Chinese design No. 304788552", Aug. 28, 2018, 5 pages.
Xiao, Yao Yao et al., "Chinese design No. 304992731, published at Orbit", Jan. 11, 2019, 5 pages.
Non-Final Office Action received for U.S. Appl. No. 29/684,606 dated Apr. 29, 2021, 79 pages.
Li, Xinrui et al., "Chinese design No. 304220928", Jul. 28, 2017, 9 pages.
Xin, "Chinese design No. 304619594, published at Orbit", May 8, 2018, 9 pages.
Wang, Hong et al., Chinese design No. 303670237, published at Orbit, publication date May 11, 2016. Site visited Apr. 21, 2021. Available from Internet. (Year: 2016), 6 pages.
Kalaska, Maciej, "RouteFinder app, posted at dribbble", URL: <https://dribbble.com/shots/6049671-RouteFinder-app> (Year: 2019), posting date Feb. 20, 2019. Site visited Apr. 24, 2021, 1 page.

\* cited by examiner

SYSTEMS AND METHODS FOR DIGITAL CHANNEL TRANSITIONS

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
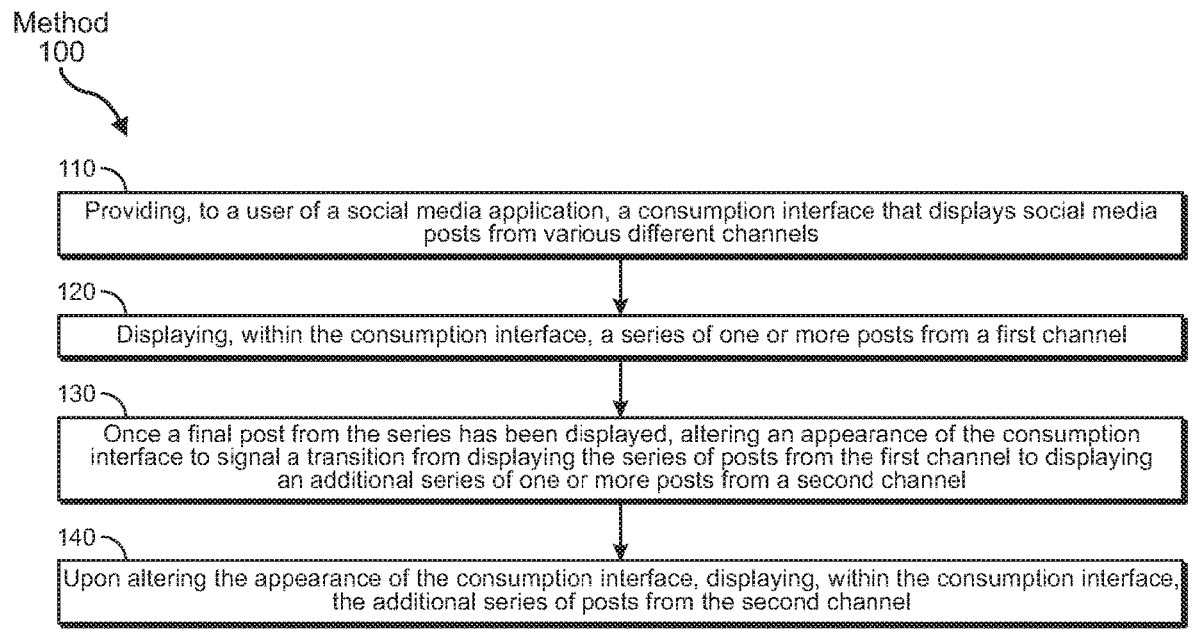
FIG. 1 is a flow diagram of an exemplary method for transitioning between content from different channels within a user interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to signaling a shift in the source of social media content displayed in a user interface. In one example, a user interface may display a stream of social media compositions from different sources (e.g., from different channels associated with different authors and/or groups of authors). In this example, a given source may create multiple compositions within a given timeframe and each of these compositions may be grouped together (i.e., displayed in succession). In many instances, there may be variance in the number of compositions created by each source within the given timeframe (e.g., a first source may have created ten compositions, a second source may have created only one composition, a third source may have created three compositions, etc.).

This variance combined with a stream that automatically transitions from compositions created by a first source to compositions created by a second source may result in source-confusion, leaving a user viewing the stream confused as to what source generated a given composition. To eliminate this confusion, the disclosed systems and methods provide a digital transition that may be displayed within the user interface each time a new source's compositions are being displayed.

This digital transition may take a variety of different forms. In one example, the digital transition may take the form of a pause. Additionally or alternatively, the digital transition may take the form of a temporary resistance to user input (e.g., scrolling input). In one example, a graphic may be displayed. The graphic may be generic (that is, the same graphic may be used for each transition) or tailored to an upcoming source. For example, the graphic may include a digital picture of the upcoming source or digital text of the name of the upcoming source. In some examples, the digital transition may include a filter applied over the face of the interface (e.g., a translucent color change), a text alert, or a change in size of one or more elements within the interface.

As will be explained in greater detail below, embodiments of the instant disclosure improve a data consumption flow for users consuming digital social media. This may improve the functioning of a computer itself by improving the computer's ability to meaningfully organize data and convey the organization of data to users.

The following will provide, with reference to FIG. 1, detailed descriptions of computer-implemented methods for digitally transitioning between content from different channels within a user interface. Detailed descriptions of corresponding example systems will also be provided in connection with FIG. 2. In addition, detailed descriptions of corresponding consumption interfaces that display content from different channels will be provided in connection with FIGS. 3-6.

FIG. 1 is a flow diagram of an exemplary computer-implemented method 100 for digitally transitioning between content from different channels within a user interface. The steps shown in FIG. 1 may be performed by any suitable computer-executable code and/or computing system. In one embodiment, the steps shown in FIG. 1 may be performed by modules operating within a user device 202, as shown in exemplary system 200 in FIG. 2. Additionally or alternatively, the steps shown in FIG. 1 may be performed by modules operating in a backend server (and/or a group of multiple servers that operate in conjunction with one another) maintained by and/or in behalf of a social networking platform. In one example, each of the steps shown in FIG. 1 may represent an algorithm whose structure includes and/or is represented by multiple sub-steps, examples of which will be provided in greater detail below.

User device 202 may represent any type or form of computing device capable of reading computer-executable instructions. For example, user device 202 may represent a user device such as a smart phone and/or a tablet. Additional examples of user device 202 may include, without limitation, laptops, desktops with mobile elements, wearable devices, personal digital assistants (PDAs), etc. In some examples, a user 204 of user device 202 may have a user account with a social-networking platform and may have an instance of a social media application 206, which is managed by the social-networking platform and associated with user 204's account, installed on user device 202. In these examples, the steps shown in FIG. 1 may be performed at least in part by modules operating in connection with social media application 206.

Social media application 206 may represent any type or form of computer program managed by a social media platform that is installed and executed on a user device (e.g., user device 202) to cause the user device to perform useful tasks related to social networking. In some examples, as will be discussed in greater detail below, social media application 206 may display various interfaces. These interfaces may include one or more composition interfaces and/or one or more consumption interfaces. The composition interfaces may allow users to create digital social media compositions to share with other users of the social media platform. The consumption interfaces may allow users to view the user compositions created by other users.

Figure 2:
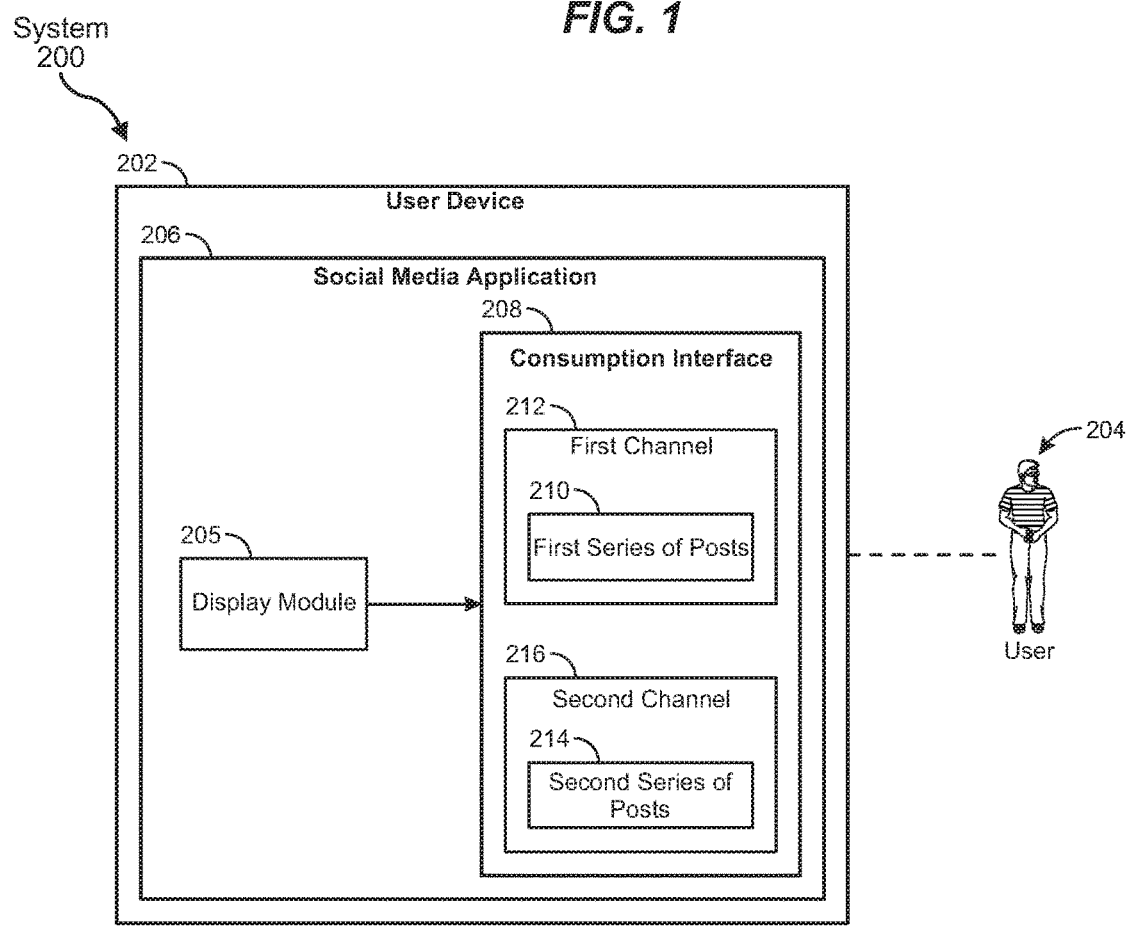
FIG. 2 is a block diagram of an exemplary system for transitioning between content from different channels within a user interface.

Returning to FIG. 1, at step 110, one or more of the systems described herein may provide, to a user of a social media application, a consumption interface that displays social media posts from various different channels. For example, as illustrated in FIG. 2, a display module 205 may provide, to user 204 via a display element of user device 202, a consumption interface 208 that displays social media posts from various different channels (e.g. a first series of posts 210 from a first channel 212 followed by a second series of posts 214 from a second channel 216).

The term "social media post" may refer to any type or form of digital social media composition, composed by a user of a social media platform, that is posted to a consumption interface displayed by a social media application of the social media platform (e.g., to be viewed by an additional user of the social media platform). A social media post may include a variety of different content. Such content may include, without limitation, a digital photograph, a digital video, a gif, text, a link, etc. Specific examples of social media posts include social media posts 210(1)-210(3) in FIG. 3 and social media posts 214(1)-214(2) in FIG. 6.

The term "channel" may refer to any type or form of digital container, maintained by a social media platform, that is dedicated to storing social media compositions from a designated source. A source of social media compositions may include, without limitation, a user account, a predetermined set of user accounts, and/or a business account.

In some examples, the disclosed systems may automatically create a primary channel for each user account that is registered with the social media platform, which may be dedicated to storing social media compositions created by its corresponding user account. In these examples, the disclosed systems may maintain each primary channel as long as its corresponding user account is active. The disclosed systems may also allow a user to create and add social media compositions to one or more additional channels. In some examples, an additional channel may be permanent (e.g., configured to be maintained as long as the user account that created the additional channel is active). In other examples, an additional channel may be ephemeral (e.g., set to expire after a certain amount of time).

Each channel may be designated by a name that distinguishes the channel from other channels. In some examples, the name may be assigned to the channel automatically. For example, a primary channel may be automatically assigned the name associated with its corresponding user account (e.g., the primary account created for the user account of an individual named "Mindy Harris" may be "Mindy Harris.") In other examples, the name may be configurable by a user. For example, an additional channel may be assigned with a name submitted via user input at the time the additional channel is created.

In some examples, a channel may be limited to only storing social media compositions from a single source (e.g., only a single user account may have permission to add social media compositions to the channel). In other examples, a channel may be limited to only storing posts from a predetermined set of sources (e.g., a limited set of user accounts may have permission to add content to the channel). In one such example, a user account creating an additional channel may be given the option to add additional user accounts as contributors to the additional channel. In this example, the sources of the additional channel may be limited to the user account and the additional user accounts added by the user account. In other examples, a channel may be designated as an open channel to which any user account may add social media compositions.

In certain embodiments, a channel may be dedicated to storing compositions relating to a particular topic and/or theme. As a specific example, a news organization may create an open channel related to a particular news event and/or movement to which any user account may add content. In this specific example, the open channel may be dedicated to social media compositions associated with the particular news event and/or movement. As another specific example, a group of friends may create a group channel related to a vacation taken by the group. In this specific example, the group channel may be dedicated to social media compositions associated with the vacation.

In addition to storing social media compositions, channels may be used as a vehicle for sharing social media compositions. In some examples, an audience for a channel may be configurable. For example, a user may select an audience for a channel via a setting in his or her user account. In examples in which a user account may add social media compositions to multiple different channels, a user of the user account may select an audience (e.g., a different audience) for each of the channels. As a specific example, user 204's user account may have access to add content to its primary channel, a family channel, and a Hong Kong 2018 channel. In this example, user 204 may have designated all of his or her contacts as the audience for the primary channel, contacts who are family members as the audience for the family channel, and contacts with whom user 204 took a trip to Hong Kong as the audience for the Hong Kong 2018 channel.

Figure 3:
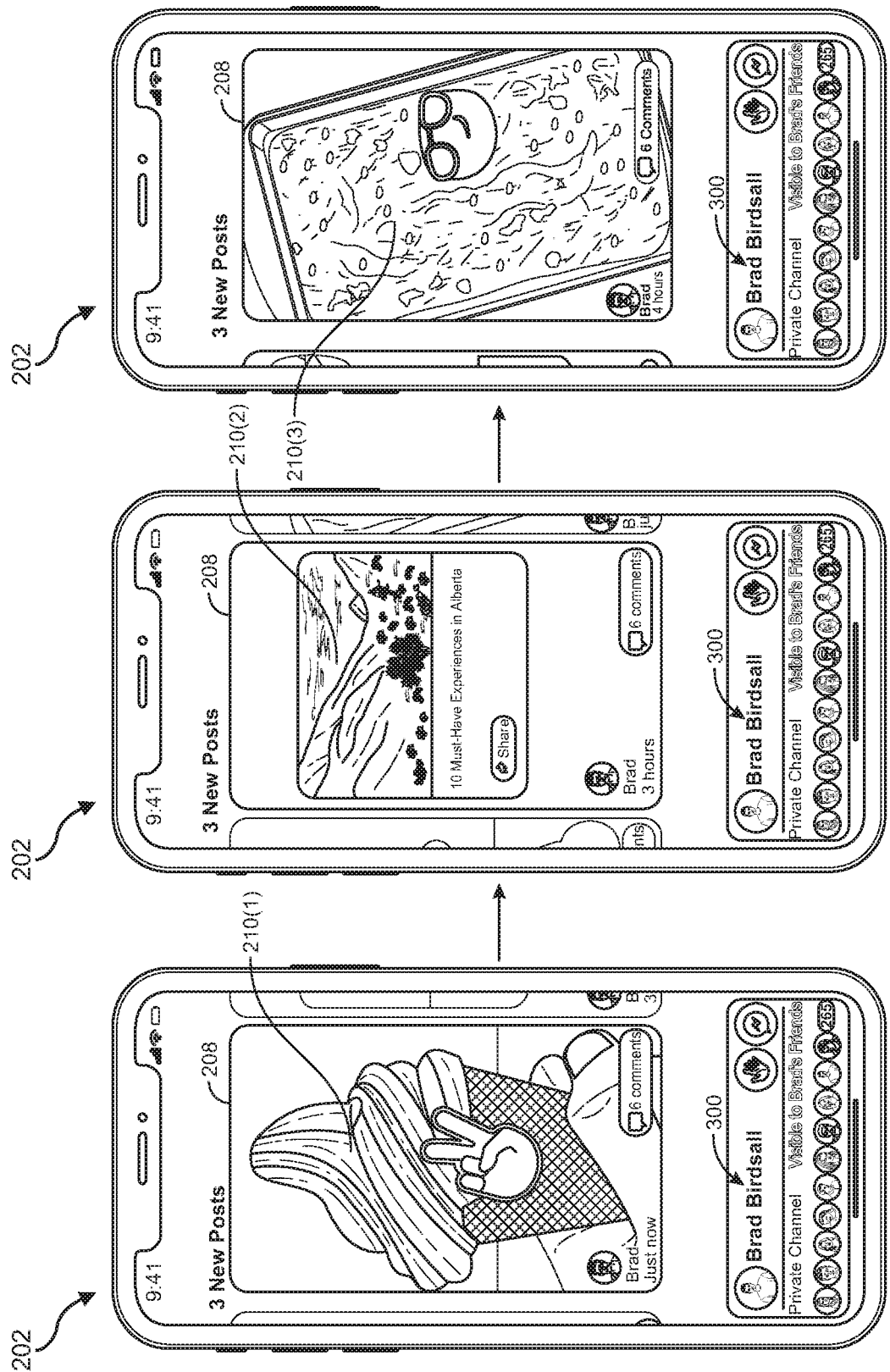
FIG. 3 is an illustration of an exemplary consumption interface in which an exemplary series of social media posts within a first channel is displayed.

The term "consumption interface" may refer to any type or form of user interface, presented by a social media application, that displays social media posts. Consumption interface 208 may display social media posts in a variety of ways. In one embodiment, consumption interface 208 may display social media posts in a scrollable stream in which social media posts are linearly displayed one after another. FIG. 3 provides an exemplary illustration of consumption interface 208 in which social media posts 210(1)-210(3) are displayed in a stream. In some examples, a stream of social media posts may scroll horizontally, as depicted in FIG. 3. In other examples, a stream of social media posts may scroll vertically. The stream may be configured to scroll between social media posts automatically and/or in response to receiving user scrolling input.

In some examples, consumption interface 208 may organize social media posts by channel. Social media posts may be organized by channel in a variety of ways. In one example, a social media post may include a designator indicating the channel from which the social media post originated. The designator may include text indicating a name of the channel and/or a digital picture and/or graphic associated with the channel. For example, as illustrated in FIG. 3, consumption interface 208 may consecutively display three social media posts (210(1), 210(2), and 210(3)) from a primary channel dedicated to a user account associated with an individual named Brad Birdsall. In this example, consumption interface 208 may visually associate social media posts 210(1)-210(3) with a channel designator 300 that displays a name of the channel (Brad Birdsall) and a profile picture of the channel (e.g., a picture selected by Brad Birdsall).

Figure 6:
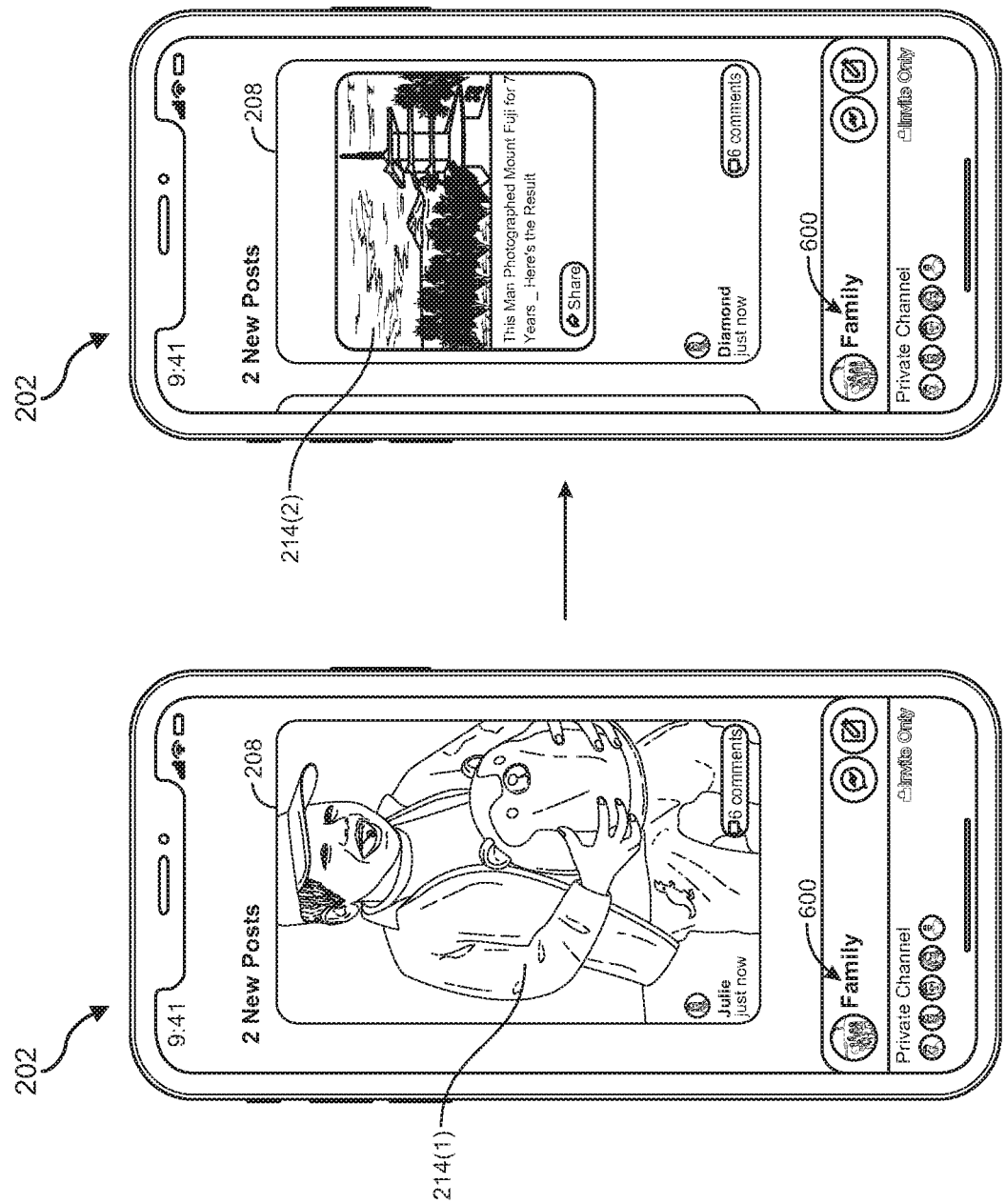
FIG. 6 is an illustration of an exemplary consumption interface in which an exemplary additional series of social media posts is displayed after the series of social media posts depicted in FIG. 3 and a transition.

As another example, illustrated in FIG. 6, consumption interface 208 may consecutively display two social media posts (214(1)-214(2)) from a group channel dedicated to the members of user 204's family. In this example, consumption interface 208 may associate social media posts 214(1)-214 (2) with a channel designator 600 that displays a name of the channel (Family) and a profile picture of the channel (e.g., a picture selected by a user who created the Family channel).

In an additional or alternative example, consumption interface 208 may organize social media posts by channel by visually grouping social media posts together by channel. That is, each social media post created by a particular channel that has been selected for display may be displayed within a stream prior to displaying social media posts from another channel within the stream, as illustrated in FIGS. 3-6.

Display module 205 may select social media posts for display using any type or form of metric. Such metrics may include a time period in which a social media post was posted (e.g., more recent social media posts may be prioritized over less recent social media posts and/or a display may be limited to social media posts that have been created within a certain time frame). Other metrics may include an importance of a relationship. For example, display module 205 may prioritize displaying social media posts from users that social media application 206 has determined have a close relationship to user 204. Other metrics may include an importance of content included within a social media post. For example, display module 205 may prioritize displaying social media posts that include content that has been determined to be of a particular importance (e.g., an announcement of an engagement). In some embodiments, social media posts may be selected for display based on a prediction of what will be of interest to user 204, which may be generated using a machine learning algorithm (e.g., based on metrics including the metrics described above).

Display module 205 may display consumption interface 208 in response to a variety of triggers. In some examples, display module 205 may automatically display consumption interface 208 as a landing screen in response to receiving user input opening social media application 206. In other examples, display module 205 may display consumption interface 208 in response to receiving user input to a selectable element that navigates to consumption interface 208 from an additional interface displayed by social media application 206.

Returning to FIG. 1, at step 120, one or more of the systems described herein may display, within the consumption interface, a series of one or more social media posts from a first channel. For example, display module 205 may display first series of posts 210 from first channel 212.

FIG. 3 provides a specific example of first series of posts 210 from first channel 212 (depicted as the "Brad Birdsall" channel in FIG. 3). In the specific embodiment depicted in FIG. 3, first channel 212 may include three new social media posts, social media posts 210(1), 210(2), and 210(3) (e.g., posts that have been added to first channel 212 within a designated amount of time), and display module 205 may display the three new social media posts in succession.

In some examples, display module 205 may scroll from displaying one post within first series of posts 210 to the next post within first series of posts 210 automatically (e.g., at a predetermined speed). In other examples, display module 205 may scroll from displaying one post within first series of posts 210 to the next in response to user device 202 receiving user input triggering the scrolling (e.g., a swiping motion to a touchscreen of user device 202).

Returning to FIG. 1, at step 130, once the final social media post from the series has been displayed, one or more of the systems described herein may alter an appearance of the consumption interface to signal a transition from displaying the series of social media posts from the first channel to displaying an additional series of one or more social media posts from a second channel. For example, display module 205 may alter an appearance of consumption interface 208 to signal a transition from displaying first series of posts 210 from first channel 212 to displaying second series of posts 214 from second channel 216.

Display module 205 may alter the appearance of consumption interface 208 in any fashion that conveys a change in channel. In some embodiments, display module 205 may display a graphical element that introduces second series of posts 214. This graphical element may take a variety of forms and include a variety of content. In some examples, display module 205 may utilize a generic graphic, meaning the same graphic may be used for each transition, such as a graphic of an arrow. In other examples, the graphic may be tailored for an upcoming source (e.g., for second series of posts 214). Using FIG. 4 as a specific example, display module 205 may display a digital element 400 with text detailing a name of the upcoming channel (i.e., "Next: Channel Family") and a profile picture corresponding to the upcoming channel.

In additional or alternative embodiments, display module 205 may create a temporary pause prior to displaying second series of posts 214. In one such embodiment, the pause may be temporal. For example, the social media posts being displayed from a particular channel may scroll across consumption interface 208 at a determined speed. Then, the speed of scrolling may temporarily decrease (or halt) after the last social media post within the particular channel has been displayed prior to displaying social media posts from a subsequent channel.

Figure 4:
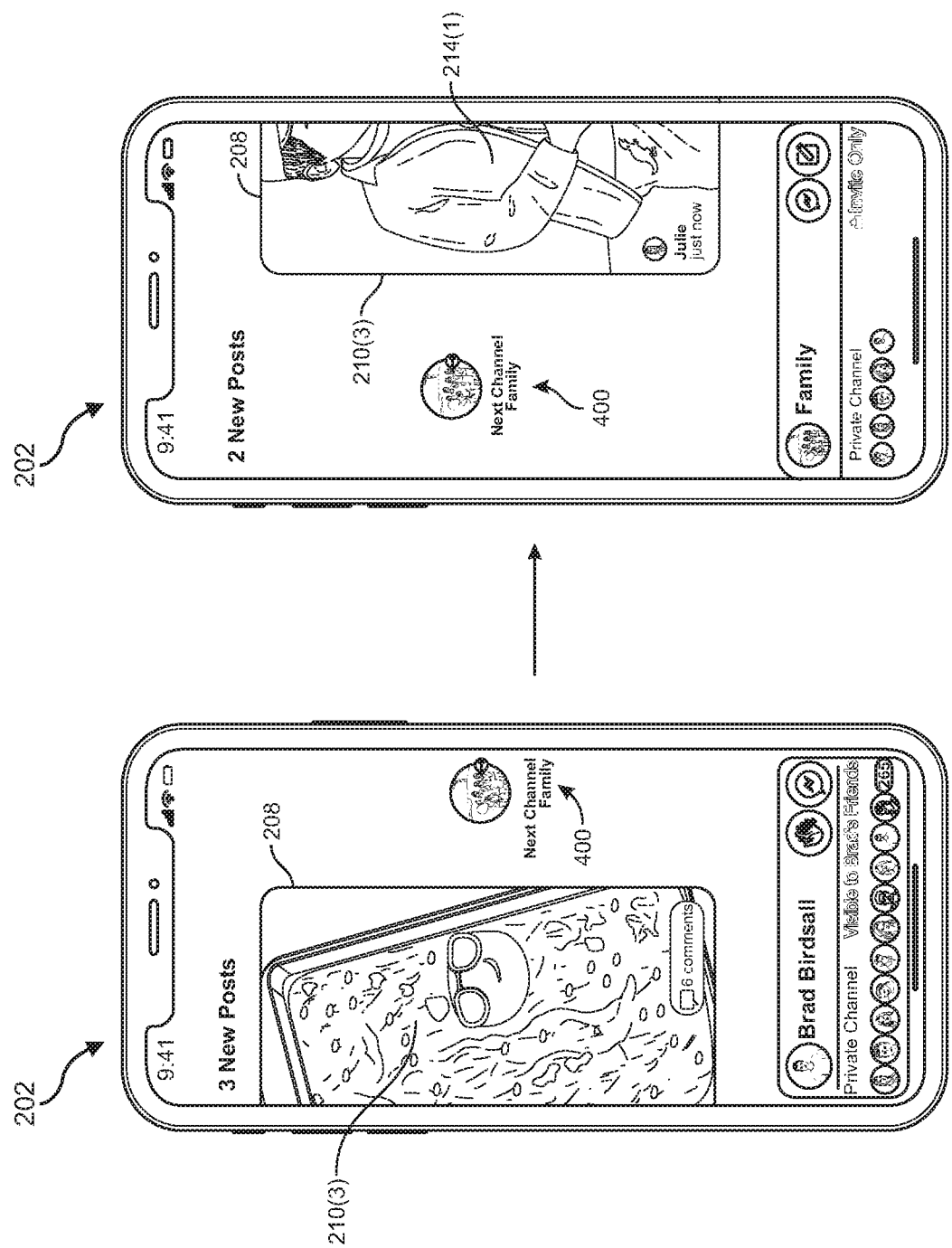
FIG. 4 is an illustration of an exemplary consumption interface in which an exemplary transition is displayed (i.e., a transition between the series of social media posts depicted in FIG. 3 and an additional series of social media posts depicted in FIG. 6).
Figure 5:
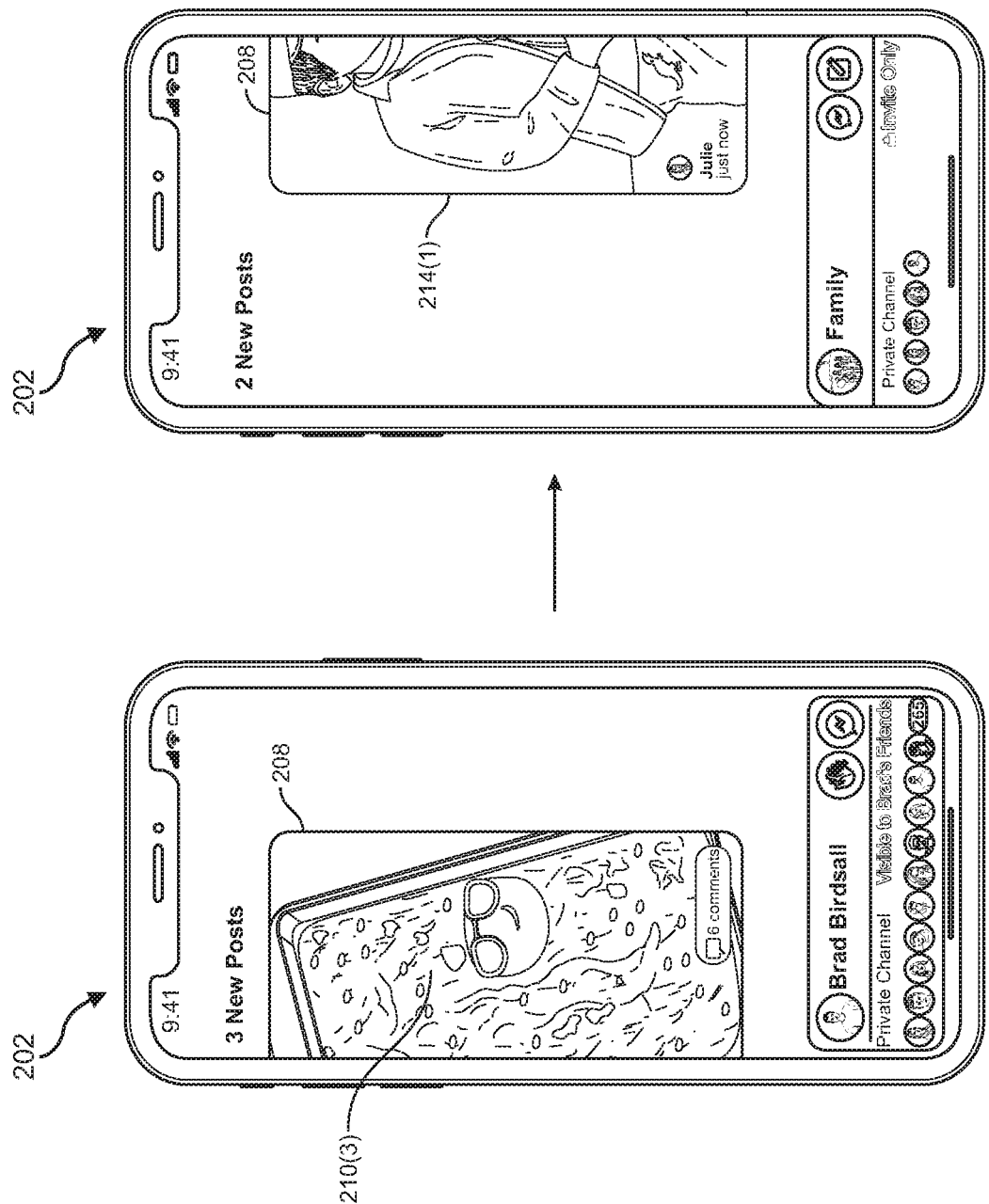
FIG. 5 is an illustration of an exemplary consumption interface in which an additional exemplary transition is displayed (i.e., an alternate transition between the series of social media posts depicted in FIG. 3 and an additional series of social media posts depicted in FIG. 6).

In an additional or alternative embodiment, the pause may be spatial. For example, display module 205 may provide a determined distance between each social media post within a series of posts within the same channel (e.g., between each social media post within first series of posts 210). Then, the distance may increase between the last social media post of a first series (e.g., first series of posts 210) and the first social media post of a subsequent series (e.g., second series of posts 214). Using FIGS. 3-5 as a specific example, the distance between each post within first series of posts 210 (depicted in FIG. 3) may be smaller than the distance between post 210(3) and 214(1) (depicted in FIG. 4 and in FIG. 5). In some examples (as shown in FIG. 4), the spatial pause may be combined with a digital graphic. In other examples (as shown in FIG. 5), the spatial pause may be used without a digital graphic.

In one embodiment, a temporary filter may be applied over the face of consumption interface 208 (e.g., a translucent color that covers the face of consumption interface 208). Additionally or alternatively, a background of consumption interface 208 may temporarily change (e.g., from black to white) and/or a size of one or more elements displayed within consumption interface 208 may temporarily change.

In some examples, the altered appearance of consumption interface 208 may include a temporary change in reaction to user input. This temporary change in reaction may take any form. In one embodiment, the temporary change in reaction may include a resistance to the user input. For example, in some embodiments display module 205 may scroll between posts in response to receiving user scrolling input (as described above in connection with step 120). In this example, display module 205 may receive user input from user 204 that triggers the display of second series of posts 214. That is, a touchscreen of user device 202 may receive a swiping motion from user 204 intended to scroll from a last post within first series of posts 210 (e.g., post 210(3) in FIG. 3) to a next post. In response to receiving user input that triggers the display of a social media post within a new channel, display module 205 may temporarily resist the user's input to scroll to the next post (e.g., temporarily preventing the user from scrolling to the next post). This temporary resistance may be configured to last for any amount of time. In certain embodiments, this temporary resistance may be very brief (e.g., less than a second).

Finally, at step 140, upon altering the appearance of the consumption interface, one or more of the systems described herein may display, within the consumption interface, the additional series of posts from the second channel. For example, as illustrated in FIG. 2, display module 205 may display, within consumption interface 208, second series of posts 214 from second channel 216. Using FIG. 6 as a specific example, display module 205 may display posts 214(1) and 214(2) from a channel named "Family Channel."

As described throughout the instant disclosure, the disclosed systems and methods may provide systems and methods for signaling a change in a channel whose contents are being displayed in a consumption interface. In one example, a computer-implemented method may include (1) providing, to a user of a social media application, a consumption interface that displays social media posts from multiple different channels, (2) displaying, within the consumption interface, a series of one or more posts from a first channel, (3) once a final post from the series has been displayed, altering an appearance of the consumption interface to signal a transition from displaying the series of posts from the first channel to displaying an additional series of one or more posts from a second channel, and (4) upon altering the appearance of the consumption interface, displaying, within the consumption interface, the additional series of posts from the second channel.

In some examples, the channel may be dedicated to content associated with an individual user and/or a group of users. Additionally or alternatively, the channel may be dedicated to content associated with a theme and/or an organization.

In one embodiment, the method may further include, prior to altering the appearance of the consumption interface, receiving user input (e.g., a swiping motion to a touchscreen of a computing device through which the consumption interface is displayed) triggering the display of the additional series of posts. In this embodiment, altering the appearance of the consumption interface may include altering a reaction of the consumption interface to the user input (e.g., by providing a response to the user input that is temporarily resistant to the user input).

In some examples, altering the appearance of the consumption interface may include creating a temporary pause prior to displaying the series of digital posts from the second channel. Additionally or alternatively, altering the appearance of the consumption interface may include displaying a graphical element that introduces the additional series of posts.

In addition, a corresponding system for implementing the above-described method may include a display module, stored in memory, that (1) provides, to a user of a social media application, a consumption interface that displays social media posts from multiple different channels, (2) displays, within the consumption interface, a series of one or more posts from a first channel, (3) once a final post from the series has been displayed, alters an appearance of the consumption interface to signal a transition from displaying the series of posts from the first channel to displaying an additional series of one or more posts from a second channel, and (4) upon altering the appearance of the consumption interface, displays, within the consumption interface, the additional series of posts from the second channel. The system may also include a processor configured to execute the display module.

In some examples, the above-described method may be encoded as computer-readable instructions on a non-transitory computer-readable medium. For example, a computer-readable medium may include one or more computer-executable instructions that, when executed by at least one processor of a computing device, may cause the computing device to (1) provide, to a user of a social media application, a consumption interface that displays social media posts from multiple different channels, (2) display, within the consumption interface, a series of one or more posts from a first channel, (3) once a final post from the series has been displayed, alter an appearance of the consumption interface to signal a transition from displaying the series of posts from the first channel to displaying an additional series of one or more posts from a second channel, and (4) upon altering the appearance of the consumption interface, display, within the consumption interface, the additional series of posts from the second channel.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device" generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium" may refer to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
    providing, to a user of a social media application, a consumption interface that displays a scrollable stream of social media posts from a plurality of different channels, wherein (1) each channel is dedicated to social media posts from a designated source, (2) social media posts are linearly displayed within the stream one after another, (3) each social media post created by a particular channel is displayed within the stream prior to the display of any social media post from another channel, (4) for the social media posts of each channel, the consumption interface automatically scrolls, at a predetermined speed, from displaying one social media post created by the channel to the next social media post created by the channel, and (5) the consumption interface automatically transitions from displaying the social media posts created by one channel to the social media posts created by the next channel;
    displaying, within the consumption interface, a series of social media posts from a first channel, automatically scrolling from displaying one social media post within the series to the next social media post within the series at the predetermined speed; and
    once a final social media post from the series has been displayed, automatically transitioning to displaying an additional series of social media posts from a second channel in queue to be displayed immediately following the series of social media posts from the first channel by:
        signaling a transition from displaying the series of social media posts from the first channel to displaying the additional series of social media posts from the second channel by automatically scrolling, from displaying the final social media post from the series to displaying a first social media post from the additional series, at a speed that is decreased relative to the predetermined speed; and
        scrolling, at the predetermined speed, from displaying the first social media post within the additional series to a second social media post within the additional series.

2. The computer-implemented method of claim 1, wherein the designated source corresponding to a channel comprises at least one of a user account, a predetermined set of user accounts, or a business account.

3. The computer-implemented method of claim 1, wherein:
    the linearly displayed social media posts are horizontally arranged; and
    automatically scrolling comprises scrolling horizontally.

4. The computer-implemented method of claim 1, wherein:
    in response to receiving user scrolling input, the consumption interface is configured to scroll at a scrolling speed corresponding to the user scrolling input, instead of scrolling at the predetermined speed;
    the method further comprises:
        while displaying, within the consumption interface, a series of social media posts from a third channel, receiving user scrolling input that triggers the display of a series of social media posts from a fourth channel in queue to be displayed immediately following the series of social media posts from the third channel; and
        altering a reaction of the consumption interface to the user scrolling input.

5. The computer-implemented method of claim 4, wherein altering the reaction comprises providing a response to the user input that is temporarily resistant to the user input.

6. The computer-implemented method of claim 1, wherein:
   each social media post, displayed via the consumption interface, comprises a designator indicating a channel from which the social media post originated, the designator comprising at least one of:
   text indicating a name of the channel;
   a digital picture associated with the channel;
   a profile element associated with the channel; or
   a graphic associated with the channel; and
   automatically transitioning to displaying the additional series further comprises transitioning from displaying a designator associated with the first channel to displaying a designator associated with the second channel.

7. The computer-implemented method of claim 1, wherein automatically transitioning to displaying the additional series of social media posts further comprises displaying a graphical element that introduces the additional series of social media posts.

8. A system comprising:
   a display module, stored in memory, that:
   provides, to a user of a social media application, a consumption interface that displays a scrollable stream of social media posts from a plurality of different channels, wherein (1) each channel is dedicated to social media posts from a designated source, (2) social media posts are linearly displayed within the stream one after another, (3) each social media post created by a particular channel is displayed within the stream prior to the display of any social media post from another channel, (4) for the social media posts of each channel, the consumption interface automatically scrolls, at a predetermined speed, from displaying one social media post created by the channel to the next social media post created by the channel, and (5) the consumption interface automatically transitions from displaying the social media posts created by one channel to the social media posts created by the next channel;
   displays, within the consumption interface, a series of social media posts from a first channel, automatically scrolling from displaying one social media post within the series to a next social media post within the series at the predetermined speed; and
   once a final social media post from the series has been displayed, automatically transitioning to displaying an additional series of social media posts from a second channel in queue to be displayed immediately following the series of social media posts from the first channel by:
   signaling a transition from displaying the series of social media posts from the first channel to displaying the additional series of social media posts from the second channel by automatically scrolling, from displaying the final social media post from the series to displaying a first social media post from the additional series, at a speed that is decreased relative to the predetermined speed; and
   scrolling, at the predetermined speed, from displaying the first social media post within the additional series to a second social media post within the additional series; and
   at least one physical processor configured to execute the display module.

9. The system of claim 8, wherein the designated source corresponding to a channel comprises at least one of a user account, a predetermined set of user accounts, or a business account.

10. The system of claim 8, wherein:
    the linearly displayed social media posts are horizontally arranged; and
    automatically scrolling comprises scrolling horizontally.

11. The system of claim 8, wherein:
    in response to receiving user scrolling input, the consumption interface is configured to scroll at a scrolling speed corresponding to the user scrolling input, instead of scrolling at the predetermined speed;
    the display module further:
    displays, within the consumption interface, a series of social media posts from a third channel;
    while displaying the series of social media posts from the third channel, receives user scrolling input that triggers the display of a series of social media posts from a fourth channel in queue to be displayed immediately following the series of social media posts from the third channel; and
    altering a reaction of the consumption interface to the user scrolling input.

12. The system of claim 11, wherein the display module alters the reaction by providing a response to the user input that is temporarily resistant to the user input.

13. The system of claim 8, wherein:
    each social media post, displayed via the consumption interface, comprises a designator indicating a channel from which the social media post originated, the designator comprising at least one of:
    text indicating a name of the channel;
    a digital picture associated with the channel;
    a profile element associated with the channel; or
    a graphic associated with the channel; and
    automatically transitioning to displaying the additional series further comprises transitioning from displaying a designator associated with the first channel to displaying a designator associated with the second channel.

14. The system of claim 8, wherein automatically transitioning to displaying the additional series of social media posts further comprises displaying a graphical element that introduces the additional series of social media posts.

15. A non-transitory computer-readable medium comprising one or more computer-readable instructions that, when executed by at least one processor of a computing device, cause the computing device to:
    provide, to a user of a social media application, a consumption interface that displays a scrollable stream of social media posts from a plurality of different channels, wherein (1) each channel is dedicated to social media posts from a designated source, (2) social media posts are linearly displayed within the stream one after another, (3) each social media post created by a particular channel is displayed within the stream prior to the display of any social media post from another channel, (4) for the social media posts of each channel, the consumption interface automatically scrolls, at a predetermined speed, from displaying one social media post created by the channel to the next social media post created by the channel, and (5) the consumption interface automatically transitions from displaying the social media posts created by one channel to the social media posts created by the next channel;
    display, within the consumption interface, a series of social media posts from a first channel, automatically scrolling from displaying one social media post within the series to the next social media post within the series at the predetermined speed; and once a final social media post from the series has been displayed, automatically transition to displaying an additional series of social media posts from a second channel in queue to be displayed immediately following the series of social media posts from the first channel by:

signaling a transition from displaying the series of social media posts from the first channel to displaying the additional series of social media posts from the second channel by automatically scrolling, from displaying the final social media post from the series to displaying a first social media post from the additional series, at a speed that is decreased relative to the predetermined speed; and scrolling, at the predetermined speed, from displaying the first social media post within the additional series to a second social media post within the additional series.

16. The non-transitory computer-readable medium of claim 15, wherein:

the linearly displayed social media posts are horizontally arranged; and automatically scrolling comprises scrolling horizontally.

17. The non-transitory computer-readable medium of claim 15, wherein:

in response to receiving user scrolling input, the consumption interface is configured to scroll at a scrolling speed corresponding to the user scrolling input, instead of scrolling at the predetermined speed;

the instructions cause the computing device to:

while displaying, within the consumption interface, a series of social media posts from a third channel, receiving user scrolling input that triggers the display of a series of social media posts from a fourth channel in queue to be displayed immediately following the series of social media posts from the third channel; and altering a reaction of the consumption interface to the user scrolling input.

18. The non-transitory computer-readable medium of claim 17, wherein the instructions cause the computing device to alter the reaction by causing the computing device to provide a response to the user input that is temporarily resistant to the user input.

19. The non-transitory computer-readable medium of claim 15, wherein automatically transitioning to displaying the additional series of social media posts further comprises displaying a graphical element that introduces the additional series of social media posts.

20. The computer-implemented method of claim 1, wherein automatically scrolling at the decreased speed comprises halting scrolling for a predetermined period.

* * * * *